United States Patent Office 3,316,331
Patented Apr. 25, 1967

3,316,331
O-ALKYL, O-PHENYL OR O-CRESYL AMINO-METHANE PHOSPHONIC ACIDS
Homer J. Sims, Horsham, Pa., assignor to Rohm & Haas Company, Philadelphia, Pa., a corporation of Delaware
No Drawing. Filed June 18, 1963, Ser. No. 288,601
8 Claims. (Cl. 260—944)

This application is a continuation-in-part of United States application Serial No. 155,472, filed November 28, 1961, now abandoned.

This invention relates to aminomethane phosphonic acids as new compositions of matter. It further deals with a method for making these aminomethane phosphonic acids. It also deals with lubricating compositions comprising aminomethane phosphonic acids.

The aminomethane phosphonic acids of the present invention may be represented by the formula

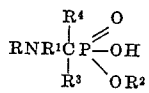

in which R represents a t-alkyl group of 8 to 24 carbon atoms, $R^1$ represents hydrogen, an alkyl group of 1 to 18 carbon atoms, an alkenyl group of 8 to 18 carbon atoms, a benzyl group or an alkyl-substituted benzyl group, in which the alkyl portion contains up to 18 carbon atoms, $R^2$ represents an alkyl group of 1 to 4 carbon atoms, a phenyl group or a cresyl group, $R^3$ represents hydrogen or an alkyl group of 1 to 7 carbon atoms and $R^4$ represents hydrogen or an alkyl group of 1 to 4 carbon atoms.

The symbol R stands for t-alkyl groups of 8 to 24 carbon atoms, preferably 12 to 18 carbon atoms. The R group may be represented by the formula

in which A stands for alkyl groups that total from 11 to 23 carbon atoms. It is necessary that the above spatial configuration be rigidly adhered to in order to realize the objects of the present invention. If R does not have the required number of carbon atoms or the above delineated structure, one or more of the necessary properties for the success of the present invention are lacking. R may represent a single group or a mixture of groups with the stated total carbon content range. Outside of the above definition, the solubility in desired media is not satisfactory or one or more of the above enumerated activities are seriously impaired or eliminated. Accordingly, it is necessary that the above definition of R be strictly adhered to.

Typical of the R embodiments are t-octyl, t-dodecyl, t-tridecyl, t-octadecyl, t-eicosanyl and t-tetracosanyl. Typical $R^1$ embodiments include hydrogen, methyl, t-butyl, isohexyl, octyl, dodecyl, octadecyl, octenyl, dodecenyl, octadecenyl, benzyl, cresyl, butyl benzyl, dioctyl benzyl, methyl dodecyl benzyl, butyl dodecyl benzyl and dinonyl benzyl. Typical embodiments of $R^2$ are methyl, ethyl, t-butyl, phenyl and cresyl. The $R^3$ embodiments include hydrogen, methyl, isopropyl, t-butyl, hexyl, and heptyl. $R^4$ is typified by hydrogen, methyl, ethyl and butyl.

The compounds of the present invention may be prepared by reacting the compound having the formula

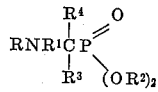

with dry hydrogen chloride or dry hydrogen bromide until acid to pH paper and then heating in the range of 60° to 150° C., preferably 75° to 120° C. with the liberation of $R^2$ chloride or bromide. It is possible to prepare the present compounds by reacting the diester with aqueous hydrochloric acid or hydrobromic acid in the presence of benzene, toluene, or the like, so that an azeotrope is formed between the water and the solvent as the reaction proceeds. The azeotropic mixture is, of course, removed from the reaction system and the reaction proceeds as described before.

With the use of either the dry or aqueous hydrogen chloride or hydrogen bromide, it is preferred to use a solvent, such as the hydrocarbon solvents: for instance, benzene or toluene, as mentioned before, or kerosene, gasoline, or any of the oils or distillate fuels in which the products will ultimately be used.

The compounds of the present invention when $R^1$, $R^3$ and $R^4$ are hydrogen may also be made by reaction between an azomethine hydrochloride or hydrobromide and dialkyl phosphite. Conveniently, the hydrogen chloride or hydrogen bromide is introduced into the azomethine to make the salt and then the dialkyl phosphite is added and the reaction system heated in the range previously mentioned.

It is also possible, and frequently desirable, when $R^1$ represents hydrogen and when the benzyl embodiments of $R^2$ are desired in the product, to start with the diester, preferably the dimethyl or diethyl ester, and react with benzyl halide or alkyl benzyl halide, preferably the chloride, followed by heating in the aforementioned range to liberate hydrogen halide and an alcohol depending on which specific $R^2$ embodiment has been employed. This approach effects the replacement of $R^1$ as hydrogen to $R^1$ as benzyl or alkyl benzyl. This is a preferred technique when the benzyl embodiments of $R^1$ are desired in the final product.

The aminomethane phosphonates employed are prepared by reacting at a temperature of about 25° to 100° C., the appropriate azomethine with a dialkyldiaryl or diaraylkyl phosphite. The azomethine may be employed as such or it may be employed in situ by reacting a t-alkyl amine with aldehyde.

The compounds of the present invention are valuable as anti-rust additives for distillate fuels and as anti-wear additives for lubricating oils or greases. It is to be construed that lubricating oils and greases mean mineral and synthetic types. The compounds of the present invention impart the above-enumerated qualities to lubricating oils and greases and distillate fuels by the addition of about .001 to 10.0% by weight of the compound to the oil, grease, or fuel contemplated. The preferred range is about 0.005 to 2.0% by weight. For lubricant formulations, the compounds of the present invention are used in the amounts of 0.1 to 10.0%, preferably 0.2 to 2.0%, by weight. In fuels, the range is 0.001 to 0.1%, preferably 0.005 to 0.05%, by weight. The compounds of the present invention with their rigidly restricted structures possess a surprisingly advantageous combination of the desired properties of solubility in the oils, greases and fuels contemplated, substantial insolubility in water and a high degree of effectiveness as anti-rust and anti-wear additives.

As will be clearly understood in the art, the distillate fuels contemplated are those that boil from 75° to 750° F. which includes gasolines, along with jet and diesel fuels and furnace oils. The present compounds are particularly useful in fuels that boil up to about 600°F., that is, the normal gasolines and jet fuels.

The compounds of the present invention, with their rigidly restricted structures, possess a surprisingly advantageous combination of the desired properties of solubility in the oils, greases and distillate fuels contemplated and a high degree of effectiveness as anti-rust and anti-wear additives.

The compounds of this invention were subjected to an anti-rust test, ASTM D–665, Procedure A for distilled water, modified to use isooctane, at 75° F. for a period of 24 hours. The compounds of the present invention were particularly effective in substantially eliminating rust with percentages of 0.01 to 0.02%. Particularly outstanding in this respect are the compounds of the present invention in which R is a mixture of t-alkyl groups having an average of 13 carbon atoms and $R^2$ is methyl or phenyl. Without these additives, heavy rust results within the period of the test.

The compounds of the invention were subjected to an anti-rust test, ASTM D–665, Procedure B for synthetic sea water, modified to use isooctane at 75° F. for a period of 16 hours. The compounds of the present invention were particularly effective in eliminating rust with percentages of 0.01 to 0.02%. Particularly outstanding in this respect is the compound of the present invention in which R is a mixture of t-alkyl groups having an average of 13 carbon atoms and $R^2$ represents methyl. Without an additive, heavy rust results within the period of the test.

The present compounds are useful herbicides, particularly in aquatic situations against duckweed in concentrations of as low as one part per million. Especially active in this respect are O-methyl-N-t-octylaminomethanephosphonic acid and O-methyl-N-t-tridecylaminomethanephosphonic acid.

The compounds of this invention, as well as the method for making them, may be more fully understood from the following examples which are offered by way of illustration and not by way of limitation. Parts by weight are used throughout.

*Example 1*

A solution of O,O-dimethyl-N-t-octylaminomethanephosphonate (12.6 parts, 0.05 m.) in 25 ml. of ether is treated with dry hydrogen chloride until acid to pH paper while the temperature is maintained at about 35° C. The solvent is removed leaving a white solid residue of the hydrochloride salt. This is heated with provision for condensing the evolved methyl chloride in a Dry Ice trap. After 1½ hours, the reaction is complete. The theoretical amount (2.5 parts) of methyl chloride has been collected and the solid remaining in the flask gives a negative test for chloride ion. The solid residue is washed with acetone and dried. The product has a melting point of 216° to 218° C., contains 5.80% nitrogen (theoretical 5.90%) and 13.30% phosphorus (theoretical 13.06%), and is identified as O-methyl-N-t-octylaminomethanephosphonic acid.

*Example 2*

Dimethylphosphite (110 parts, 1.0 m.) is added dropwise to t-tridecyl azomethine (206 parts, 1.0 m.). The mixture is then heated at 60° to 70° C. for 2 hours. Toluene (200 ml.) is added and dry hydrogen chloride (36.5 parts, 1.0 m.) introduced at a temperature at about 35° C. The toluene solution is refluxed with provision for trapping evolved methyl chloride. The heating is discontinued when 50 parts of distillate has collected. The product is freed to benzene by heating up to 80° to 90° C./20 mm. The very viscous product is brittle when cool and weighs 301 parts. It still contains 1.8% chloride or about 15% of the total which is introduced as hydrogen chloride. The product is identified as O-methyl-N-t-tridecylaminomethanephosphonic acid.

*Example 3*

Anhydrous hydrogen chloride (18.8 parts, 0.5 m.) is introduced into a solution of O,O-dimethyl-N-t-tridecylaminobutanephosphonate (179.5 parts, 0.5 m.) in toluene (100 parts). The mixture is then heated to reflux with provision for trapping the evolved methyl chloride. After about 5 hours, the evolution of methyl chloride ceases and the solvent is removed by stripping under aspirator vacuum up to 80° C. at 20 mm. absolute pressure. The residue weighs 173 parts (theoretical 175 parts).

The product contains 4.04% nitrogen (4.00% theoretical) and 8.80% phosphorus (8.86% theoretical). It is identified as O-methyl-N-t-tridecylaminobutanephosphonic acid.

*Example 4*

A mixture of O,O-dimethyl-N-t-tridecylaminomethanephosphonate (332 parts, 1.0 m.) and water (27 parts, 1.5 m.) is placed in an autoclave. The autoclave is sealed and the mixture stirred and heated at 130° to 140° C. for five hours. The autogenous pressure is about 50 p.s.i.g. The mixture is allowed to cool and vacuum is gradually applied to remove the by-product methanol and excess water. The yield of product is substantially quantitative.

The product contains 4.60% nitrogen (4.55% theoretical) and 9.50% phosphorus (10.07% theoretical). It is identified as O-methyl-N-t-tridecylaminomethanephosphonic acid.

*Example 5*

A solution of O,O-dimethyl-N-t-octylaminomethanephosphonate (25.1 parts, 0.1 m.), concentrated hydrochloric acid (9.9 parts of aqueous 37%, 0.1 m.) and benzene (100 ml.) is heated slowly to reflux temperature. At 50° to 60° C., there begins evolution of methyl chloride. This continues during the refluxing period. Water is removed by azeotropic distillation and is collected in a Dean-Stark tube. When the mixture is dry, the benzene is removed under aspirator vacuum. The residue weighs 22 parts (theoretical 23.7%).

The product contains 5.7% nitrogen (theoretical 5.9%), 12.4% phosphorus (theoretical 13.1%) and has a neutral equivalent of 241 (theoretical 237).

The product is identified as O-methyl-N-t-octylaminomethanephosphonic acid.

*Example 6*

A mixture of O,O-dimethyl-N-t-octylaminomethanephosphonate (25.1 parts, 0.1 m.) and water (9 parts, 0.5 m.) is heated in an autoclave at 130° to 140° C. for four hours. The autogenous pressure does not exceed about 70 p.s.i.g. The semi-solid reaction mass is transferred to a flask and dried under vacuum. The weight of the white solid residue is 22.8 parts (96% of theory). The neutralization equivalent of this crude material is 243 by titration with sodium ethoxide in ethanol (theoretical 237). The product is identified as O-methyl-N-t-octylaminomethanephosphonic acid.

*Example 7*

Hydrogen chloride gas (28.2 parts, 0.75 m.) is introduced into a solution of O,O-dimethyl-N-t-octadecylaminomethanephosphonate (345 parts, 0.75 m.) in toluene (200 parts). The mixture is slowly heated to reflux until the evolution of methyl chloride ceases. The reaction mixture is then heated under aspirator vacuum up to 80° C. at 20 mm. absolute pressure to remove the solvent. The residue weighs 323 parts (theoretical 338). The product contains 3.4% nitrogen (theoretical 3.1%) and 6.7% phosphorus (theoretical 6.9%). The product is identified as O-methyl-N-t-octadecylaminomethanephosphonic acid.

*Example 8*

Hydrogen chloride gas (9.0 parts, 0.25 m.) is introduced into a solution of O,O-diethyl-N-t-dodecylaminomethanephosphonate (86 parts, 0.25 m.) in 100 parts of benzene. After a four hour reflux period, the total weight loss due to evolution of ethyl chloride is 8 parts. The solvent is removed under aspirator vacuum and the residue heated up to 85° C. at 25 mm. absolute pressure. The final weight of the residue is 80 parts. The product contains 4.3% nitrogen (theoretical 4.4%), 9.8% phosphorus (theoretical 9.8%) and has a neutral equivalent of 324 (theoretical 316). The product is identified as O-ethyl-N-t-dodecylaminomethanephosphonic acid.

*Example 9*

A mixture of O,O-dimethyl-N-t-tridecylaminomethanephosphonate (31.4 parts, 0.1 m.) and chloromethylated dodecyltoluene (26.6 parts, 0.1 equivalent of chlorine) is heated slowly to about 170° C. At about this temperature, evolution of methyl chloride begins and the temperature continues to rise to about 190° C. Heating is continued at about 170° C. for three hours or until the evolution of methyl chloride has practically ceased. Based on the amount of evolved methyl chloride and unreacted chlorine, the reaction proceeds to 86% completion. The product is identified as O-methyl-N-t-tridecyl-N-methyl-dodecylbenzylaminomethanephosphonic acid.

*Example 10*

A mixture of O,O-dimethyl-N,N-dihexadecylaminomethanephosphonate (57 parts) and water (1.8 part) is heated in an autoclave at 130° to 140° C. for six hours. The methanol and any remaining water is removed at 60° C. at 20 mm. of mercury. The product contains 5.5% phosphorus (theoretical 5.65%) and 2.6% nitrogen (theoretical 2.56%). The product is identified as O-methyl-N,N-dihexadecylaminomethanephosphonic acid.

*Example 11*

A solution of O,O-dimethyl-N-t-tridecyl-N-benzylaminomethanephosphonate (40 parts, 0.1 m.) in benzene (100 parts) is treated with an equivalent weight of hydrogen chloride gas. The mixture is then refluxed for 6½ hours to decompose the hydrochloride salt and drive off methyl chloride. The residue remaining after removal of solvent is 40 parts. The product contains 7.5% phosphorus (theoretical 7.96%), 3.5% nitrogen (theoretical 3.59%) and has a neutral equivalent of 386 (theoretical 389). The product is identified as O-methyl-N-t-tridecyl-N-benzyl-aminomethanephosphonic acid.

In the same manner, there is prepared the product of this invention where R is t-octyl, $R^1$ is dodecenyl, $R^2$ is methyl, $R^3$ is hydrogen and $R^4$ is hydrogen.

*Example 12*

There is prepared by the hydrolysis procedure described in Example 9 the product identified as O-methyl-N-n-dodecyl-2-amino-2-propanephosphonic acid. Starting with 22.5 parts (0.1 m.) of ester, there are obtained 20.1 parts of monobasic acid.

*Example 13*

A mixture of O,O-dimethyl-N-t-butylamino-2-ethylhexanephosphonate (29.6 parts, 0.1 m.) and water (2.5 parts) is heated at 85° C. for fourteen hours. The excess water and methanol are removed under vacuum. The product contains 5.1% nitrogen (theoretical 4.98%), 10.7% phosphorus (theoretical 11.0%) and has a neutral equivalent of 282 (theoretical 282).

I claim:
1. The compound having the formula

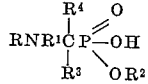

in which R represents a t-alkyl group of 8 to 24 carbon atoms,
$R^1$ is a member selected from the class consisting of hydrogen, alkyl of 1 to 18 carbon atoms, alkenyl of 8 to 18 carbon atoms, benzyl and alkyl-substituted benzyl in which the alkyl portion has a total of up to 18 carbon atoms,
$R^2$ is a member selected from the class consisting of alkyl of 1 to 4 carbon atoms, phenyl and cresyl,
$R^3$ is a member selected from the class consisting of hydrogen and alkyl of 1 to 7 carbon atoms, and
$R^4$ is a member selected from the class consisting of hydrogen and alkyl of 1 to 4 carbon atoms.
2. The compound of claim 1 in which $R^1$ is hydrogen, $R^2$ is alkyl of 1 to 4 carbon atoms and $R^3$ is hydrogen.
3. The compound of claim 1 in which R is a t-alkyl group of 12 to 18 carbon atoms.
4. The compound, O-methyl-N-t-octylaminomethanephosphonic acid.
5. The compound, O-methyl-N-t-tridecylaminomethanephosphonic acid.
6. The compound, O-methyl-N-t-octadecylaminomethanephosphonic acid.
7. The compound, O-ethyl-N-t-dodecylaminomethanephosphonic acid.
8. The compound, O-methyl-N-t-tridecyl-N-benzylaminomethanephosphonic acid.

References Cited by the Examiner
UNITED STATES PATENTS

| | | | |
|---|---|---|---|
| 2,570,503 | 10/1951 | Tawney | 260—945 |
| 3,000,710 | 9/1961 | Kirk | 44—72 |
| 3,007,784 | 11/1961 | Ebner | 44—72 |
| 3,033,789 | 5/1962 | Asseff | 252—49.9 |
| 3,051,655 | 8/1962 | Baker | 252—49.9 |
| 3,076,010 | 1/1963 | Beck et al. | 260—945 |

CHARLES B. PARKER, *Primary Examiner.*

BERNARD BILLIAN, FRANK M. SIKORA,
*Assistant Examiners.*